United States Patent
Parker

(10) Patent No.: US 7,125,934 B1
(45) Date of Patent: Oct. 24, 2006

(54) FUNCTIONALIZATION OF LIVING RUBBERY POLYMERS WITH NITRONES

(75) Inventor: Dane Kenton Parker, Massillon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/169,996

(22) Filed: Jun. 28, 2005

(51) Int. Cl.
*C08C 19/22* (2006.01)

(52) U.S. Cl. .............................. 525/331.9; 525/332.1; 525/332.2; 525/322.8; 525/332.9; 525/333.1; 525/333.2; 525/377

(58) Field of Classification Search ............ 525/331.9, 525/332.1, 332.2, 332.8, 332.9, 333.1, 333.2, 525/377
See application file for complete search history.

(56) References Cited

U.S. PATENT DOCUMENTS

| | | | |
|---|---|---|---|
| 3,792,031 A * | 2/1974 | Udding et al. .............. | 525/340 |
| 3,903,049 A * | 9/1975 | Saltman et al. ............. | 525/152 |
| 4,048,420 A | 9/1977 | Francois et al. ............ | 526/173 |
| 4,935,471 A | 6/1990 | Halasa et al. ............ | 525/359.1 |
| 5,723,502 A | 3/1998 | Proctor ....................... | 514/741 |
| 6,107,315 A | 8/2000 | Carney et al. .............. | 514/345 |
| 6,333,381 B1 | 12/2001 | Asada et al. .................. | 525/71 |
| 6,762,322 B1 | 7/2004 | Parker ........................ | 564/253 |

OTHER PUBLICATIONS

Tada et al., J. Applied Polymer Sci. 15 (1971) 117-128.*

* cited by examiner

*Primary Examiner*—Roberto Rabago
(74) *Attorney, Agent, or Firm*—Alvin T. Rockhill

(57) ABSTRACT

This invention discloses a low cost process that can be used to functionalize living rubbery polymers with terminal nitroxide end-groups to promote interaction between the polymer end-groups and surface functionalities commonly found on carbon black and silica fillers. Such functionalization makes the rubbery polymer more desirable for used in tire tread compositions and other rubber products. This technique more specifically involves reacting a metal terminated living polydiene rubber with a nitrone. The metal will typically be lithium and the polydiene rubber will typically be a polybutadiene rubber, a polyisoprene rubber, a styrene-butadiene rubber, a styrene-isoprene-butadiene rubber, an isoprene-butadiene rubber, or a styrene-isoprene rubber.

19 Claims, No Drawings

FUNCTIONALIZATION OF LIVING RUBBERY POLYMERS WITH NITRONES

BACKGROUND OF THE INVENTION

Metals from Groups I and II of the periodic table are commonly used to initiate the polymerization of monomers into polymers. For example, lithium, barium, magnesium, sodium, and potassium are metals that are frequently utilized in such polymerizations. Initiator systems of this type are of commercial importance because they can be used to produce stereo regulated polymers. For instance, lithium initiators can be utilized to initiate the anionic polymerization of isoprene into synthetic polyisoprene rubber or to initiate the polymerization of 1,3-butadiene into polybutadiene rubber having the desired microstructure.

The polymers formed in such polymerizations have the metal used to initiate the polymerization at the growing end of their polymer chains and are sometimes referred to as living polymers. They are referred to as living polymers because their polymer chains which contain the terminal metal initiator continue to grow or live until all of the available monomer is exhausted. Polymers that are prepared by utilizing such metal initiators normally have structures which are essentially linear and normally do not contain appreciable amounts of branching.

Rubbery polymers made by living polymerization techniques are typically compounded with sulfur, accelerators, antidegradants, a filler, such as carbon black, silica or starch, and other desired rubber chemicals and are then subsequently vulcanized or cured into the form of a useful article, such as a tire or a power transmission belt. It has been established that the physical properties of such cured rubbers depend upon the degree to which the filler is homogeneously dispersed throughout the rubber. This is in turn related to the level of affinity that filler has for the particular rubbery polymer. This can be of practical importance in improving the physical characteristics of rubber articles which are made utilizing such rubber compositions. For example, the rolling resistance and traction characteristics of tires can be improved by improving the affinity of carbon black and/or silica to the rubbery polymer utilized therein. Therefore, it would be highly desirable to improve the affinity of a given rubbery polymer for fillers, such as carbon black and silica.

In tire tread formulations better interaction between the filler and the rubbery polymer results in lower hysteresis and consequently tires made with such rubber formulations have lower rolling resistance. Low tan delta values at 60° C. are indicative of low hysteresis and consequently tires made utilizing such rubber formulations with low tan delta values at 60° C. normally exhibit lower rolling resistance. Better interaction between the filler and the rubbery polymer in tire tread formulations also typically results higher tan delta values at 0° C. which is indicative of better traction characteristics.

The interaction between rubber and carbon black has been attributed to a combination of physical absorption (van der Waals force) and chemisorption between the oxygen containing functional groups on the carbon black surface and the rubber (see D. Rivin, J. Aron, and A. Medalia, Rubber Chem. & Technol. 41, 330 (1968) and A. Gessler, W. Hess, and A Medalia, Plast. Rubber Process, 3, 141 (1968)). Various other chemical modification techniques, especially for styrene-butadiene rubber made by solution polymerization (S-SBR), have also been described for reducing hysteresis loss by improving polymer-filler interactions. In one of these techniques, the solution rubber chain end is modified with aminobenzophenone. This greatly improves the interaction between the polymer and the oxygen-containing groups on the carbon black surface (see N. Nagata, Nippon Gomu Kyokaishi, 62, 630 (1989)). Tin coupling of anionic solution polymers is another commonly used chain end modification method that aids polymer-filler interaction supposedly through increased reaction with the quinone groups on the carbon black surface. The effect of this interaction is to reduce the aggregation between carbon black particles which in turn, improves dispersion and ultimately reduces hysteresis.

U.S. Pat. No. 4,935,471 (to Adel F. Halasa et al.) discloses a means for capping living polydiene rubbers in order to improve their affinity for carbon black. The capped rubbery polymers made by this technique are reported to be useful in manufacturing tire treads which have lower level of rolling resistance and better traction characteristics. This patent more specifically discloses polydiene rubber having a high level of affinity for carbon black which is comprised of polymer chains having repeat units which are derived from at least one conjugated diolefin monomer wherein said polymer chains are terminated with a member selected from the group consisting of cyanide groups and heterocyclic aromatic nitrogen containing groups. U.S. Pat. No. 4,935,471 also reveals a process for preparing a polydiene rubber having a high level of affinity for carbon black which comprises reacting a metal terminated polydiene with a capping agent selected from the group consisting of (a) halogenated nitrites having the structural formula X-A-C≡N wherein X represents a halogen atom and wherein A represents an alkylene group containing from 1 to 20 carbon atoms, (b) heterocyclic aromatic nitrogen containing compounds, and (c) alkyl benzoates.

Perhaps more interesting from a chemistry perspective are the persistent literature references to rubber "additives" that improve vulcanizate properties such as fatigue, dynamic modulus and hysteresis loss by modifying the polymer-filler interaction (see A Zyusin et al., Internat. Poly. Sci. & Tech., 11 (2), T/56 (1984); A Payne et al., J. Rubber Res. Inst. Malaya, 22, 275 (1969); H Leeper et. al., Rubber World, 135, 413 (1956); A Lykin et. al., Rubber Chem. & Technol., 46, 575 (1973); A Klasek et al., J. Applied Poly. Sci., 61, 1137 (1996); V. Strygin et al., Internat. Poly. Sci. & Tech., 24 (3), T/14 (1997); K Tada et. al., J. Applied Poly. Sci., 15, 117 (1971); D Graves, Rubber Chem. & Technol., 66, 62 (1993); and L Gonzalez et al., Rubber Chem. & Technol., 69, 266 (1996)).

One of the first additives seen to have such an effect was p-nitrosodiphenylamine (PNDPA). This material was originally developed by scientists from the Natural Rubber Producers Research Association, (NRPRA), for its antioxidant activity and its ability to chemically bind to the polyisoprene structure through the nitroso group (see A Payne et al., J. Rubber Res. Inst. Malaya, 22, 275 (1969). Subsequent extensive work by Russian scientists, however, discovered that polyisoprene modified with PNDPA during mixing ultimately decreases hysteresis loss in vulcanizates and improves the green strength of the mixes. While it was clear from bound rubber measurements and other techniques that there was a preferential adsorption of the modified macromolecules on the surface of the carbon black, the nature of the bonding could not be clearly determined with the analytical tools of the time.

Nitrones are useful intermediates in a wide variety of applications. For example, nitrones are important as intermediates in organic synthesis, particularly in [3+2] cyclo addition reactions. Nitrones are excellent 1,3-dipoles and capable of reacting with double and triple bonds to form 5-membered heterocyclic ring structures. For example, isoxazolines and isoxazoles are formed by reacting nitrones with carbon—carbon double and triple bonds respectively. Accordingly, nitrones have been utilized for synthesizing various nitrogen containing biologically active compounds, for example, antibiotics, alkyloids, amino sugars, and beta-lactams.

In addition, nitrones are also known for their ability to act as efficient free radical "spin traps". Nitrones behave as spin trapping agents when a diamagnetic nitrone (the spin trap) reacts with a transient free radical (having a spin) to provide a more stable free radical (referred to as the spin adduct). More specifically, a very reactive oxygen-centered or carbon-centered free radical reacts with the nitrone to generate a new and very stable nitroxide radical adduct. The radical adduct generated may be detectable by electron para-magnetic resonance (EPR) spectroscopy if the stabilized free radical has a reasonable lifetime. Further, information about a spin of a radical can be gleaned from a study of the structure and spectroscopic characteristics of the new radical adduct due to the increased radical stability and lifetime. Thus, techniques utilizing nitrone spin trapping agents are an important method for garnering information on free radicals otherwise difficult or impossible to detect by direct spectroscopic observation due to their exceedingly short lifetimes and low concentrations.

Techniques utilizing nitrone spin trapping agents are also useful for studying free radical responses in biological systems. For example, the toxicity of a synthetic beta amyloid peptide preparation towards glutamine synthesis could be correlated with the characteristics of an EPR signal generated by the spin adduct formed from each batch of synthetic beta amyloid peptide and spin trap. U.S. Pat. No. 6,107,315 discloses the use of a spin trapping reagent, such as α-phenyl-N-tert-butyl nitrone (PBN), in a suitable pharmaceutical carrier for administration to a patient for the treatment of symptoms associated with aging or other conditions associated with oxidative tissue damage. U.S. Pat. No. 5,723,502 discloses a method for ameliorating a cellular dysfunction of a tissue, such as the cosmetic treatment of hair loss and stimulation of hair growth, by administering a nitrone spin trap, such as PBN, to the affected tissue.

Nitrones have also been found to be useful as agents for controlled free radical polymerization. More specifically, the presence of a stable nitrone free radical during the polymerization or copolymerization of monomers provides for control of polymerization and results in polymers having a relatively narrow polydispersity, relative to polymers formed in the absence of a stable nitrone free radical. For example, U.S. Pat. No. 6,333,381 discloses the use of PBN to control the polymerization used in the synthesis of various types of rubbers.

SUMMARY OF THE INVENTION

The subject invention provides a low cost means for the end-group functionalization of rubbery living polymers to improve their affinity for fillers, such as carbon black and/or silica. Such functionalized polymers can be beneficially used in manufacturing tires and other rubber products where improved polymer/filler interaction is desirable. In tire tread compounds this can result in lower polymer hysteresis which in turn can provide a lower level of tire rolling resistance.

The present invention more specifically discloses a process for preparing a polydiene rubber having a high level of affinity for fillers which comprises reacting a metal terminated polydiene rubber with a nitrone. The metal will typically be lithium and the polydiene rubber will normally be a polybutadiene rubber, a polyisoprene rubber, a styrene-butadiene rubber, a styrene-isoprene-butadiene rubber, an isoprene-butadiene rubber, or a styrene-isoprene rubber.

The subject invention further reveals a hydroxylamine end-group functionalized rubbery polymer which is comprised of polymer chains of the structural formula:

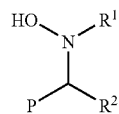

wherein P represents polymer chains of the rubbery polymer, and wherein (i) $R^1$ and $R^2$ are independently selected from the group consisting of substituted or unsubstituted straight, branched, or cyclic alkyl groups, alkenyl groups, alkynyl groups, aryl groups, heteroaryl groups, alkaryl groups, alkoxyl groups, halo-alkyl groups, and combinations thereof; or (ii) $R^1$ and $R^2$ taken together with the carbon and nitrogen to which they are attached form a 5 to 8 membered ring.

The subject invention also discloses a rubber formulation which is comprised of (1) a hydroxylamine end-group functionalized rubbery polymer which is comprised of polymer chains of the structural formula:

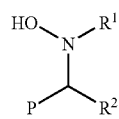

wherein P represents polymer chains of the rubbery polymer, and wherein (i) $R^1$ and $R^2$ are independently selected from the group consisting of substituted or unsubstituted straight, branched, or cyclic alkyl groups, alkenyl groups, alkynyl groups, aryl groups, heteroaryl groups, alkaryl groups, alkoxyl groups, halo-alkyl groups, and combinations thereof; or (ii) $R^1$ and $R^2$ taken together with the carbon and nitrogen to which they are attached form a 5 to 8 membered ring, and (2) a filler selected from the group consisting of carbon black and silica.

The subject invention further discloses a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is a cured the rubber formulation which is comprised of (1) hydroxylamine end-group functionalized rubbery polymer of the structural formula:

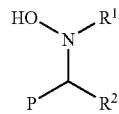

wherein P represents polymer chains of the rubbery polymer, and wherein (i) $R^1$ and $R^2$ are independently selected from the group consisting of substituted or unsubstituted straight, branched, or cyclic alkyl groups, alkenyl groups, alkynyl groups, aryl groups, heteroaryl groups, alkaryl groups, alkoxyl groups, halo-alkyl groups, and combinations thereof, or (ii) $R^1$ and $R^2$ taken together with the carbon and nitrogen to which they are attached form a 5 to 8 membered ring; and (2) a filler selected from the group consisting of carbon black and silica.

DETAILED DESCRIPTION OF THE INVENTION

The subject invention provides a means for the end-group functionalization of rubbery living polymers to improve their affinity for fillers, such as carbon black and/or silica. The process of the present invention can be used to functionalize any living polymer which is terminated with a metal of group I or II of the periodic table. These polymers can be produced utilizing techniques that are well known to persons skilled in the art. The metal terminated rubbery polymers that can be functionalized with nitrones in accordance with this invention can be made utilizing monofunctional initiators having the general structural formula P-M, wherein P represents a polymer chain and wherein M represents a metal of group I or II. The metal initiators utilized in the synthesis of such metal terminated polymers can also be multifunctional organometallic compounds. For instance, difunctional organometallic compounds can be utilized to initiate such polymerizations. The utilization of such difunctional organometallic compounds as initiators generally results in the formation of polymers having the general structural formula M-P-M, wherein P represents a polymer chain and wherein M represents a metal of group I or II. Such polymers which are terminated at both of their chain ends with a metal from group I or II also can be reacted with nitrones to functionalize both of their chain ends. It is believed that utilizing difunctional initiators so that both ends of the polymers chain can be functionalized will the nitrone can further improve interaction with fillers, such as carbon black and silica.

The initiator used to initiate the polymerization employed in synthesizing the living rubbery polymer that is functionalized in accordance with this invention is typically selected from the group consisting of barium, lithium, magnesium, sodium, and potassium. Lithium and magnesium are the metals that are most commonly utilized in the synthesis of such metal terminated polymers (living polymers). Normally, lithium initiators are more preferred.

Organolithium compounds are the preferred initiators for utilization in such polymerizations. The organolithium compounds which are utilized as initiators are normally organo monolithium compounds. The organolithium compounds which are preferred as initiators are monofunctional compounds which can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of preferred butyllithium, secbutyllithium, n-hexyllithium, n-octyllithium, tertoctyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Secondary-butyllithium is a highly preferred organolithium initiator. Very finely divided lithium having an average particle diameter of less than 2 microns can also be employed as the initiator for the synthesis of living rubbery polymers that can be functionalized with nitrones in accordance with this invention. U.S. Pat. No. 4,048,420, which is incorporated herein by reference in its entirety, describes the synthesis of lithium terminated living polymers utilizing finely divided lithium as the initiator. Lithium amides can also be used as the initiator in the synthesis of living polydiene rubbers (see U.S. Pat. No. 4,935,471 the teaching of which are incorporated herein by reference with respect to lithium amides that can be used as initiators in the synthesis of living rubbery polymer).

The amount of organolithium initiator utilized will vary depending upon the molecular weight which is desired for the rubbery polymer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

Many types of unsaturated monomers which contain carbon—carbon double bonds can be polymerized into polymers using such metal catalysts. Elastomeric or rubbery polymers can be synthesized by polymerizing diene monomers utilizing this type of metal initiator system. The diene monomers that can be polymerized into synthetic rubbery polymers can be either conjugated or nonconjugated diolefins. Conjugated diolefin monomers containing from 4 to 8 carbon atoms are generally preferred. Vinyl-substituted aromatic monomers can also be copolymerized with one or more diene monomers into rubbery polymers, for example styrene-butadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, .alpha.-methylstyrene, and the like.

The metal terminated rubbery polymers that are functionalized with nitrones in accordance with this invention are generally prepared by solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

The metal terminated living rubbery polymers utilized in the practice of this invention can be of virtually any molecular weight. However, the number average molecular weight of the living rubbery polymer will typically be within the range of about 50,000 to about 500,000. It is more typical for such living rubbery polymers to have number average molecular weights within the range of 100,000 to 250,000.

The metal terminated living rubbery polymer can be functionalized by simply adding a stoichiometric amount of a nitrone to a solution of the rubbery polymer (a rubber cement of the living polymer). In other words, approximately one mole of the nitrone is added per mole of terminal metal groups in the living rubbery polymer. The number of moles of metal end groups in such polymers is assumed to be the number of moles of the metal utilized in the initiator. It is, of course, possible to add greater than a stoichiometric amount of the nitrone. However, the utilization of greater amounts is not beneficial to final polymer properties. Nevertheless, in many cases it will be desirable to utilize a slight excess of the nitrone to insure that at least a stoichiometric amount is actually employed or to control the stoichiometry of the functionalization reaction. In most cases from about 0.8 to about 1.1 moles of the nitrone will be utilized per mole of metal end groups in the living polymer being treated. In the event that it is not desired to functionalize all of the metal terminated chain ends in a rubbery polymer then, of course, lesser amounts of the nitrone can be utilized.

Nitrones will react with the metal terminated living rubbery polymer over a very wide temperature range. For practical reasons the functionalization of such living rubbery polymers will normally be carried out at a temperature within the range of 0° C. to 150° C. In order to increase reaction rates, in most cases it will be preferred to utilize a temperature within the range of 20° C. to 100° C. with temperatures within the range of 50° C. to 80° C. being most preferred. The capping reaction is very rapid and only very short reaction times within the range of 0.5 to 4 hours are normally required. However, in some cases reaction times of up to about 24 hours may be employed to insure maximum conversions.

The nitrones which are used in the practice of this invention are of the general structural formula:

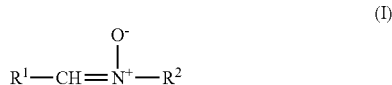

(I)

wherein $R^1$ and $R^2$, are independently selected from the group consisting of substituted or unsubstituted straight, branched, or cyclic alkyl groups, alkenyl groups, alkynyl groups, aryl groups, heteroaryl groups, alkaryl groups, alkoxyl groups, halo-alkyl groups, and combinations thereof. Alternatively, $R^1$ and $R^2$ taken together with the carbon and nitrogen to which they are attached form a 5 to 8 membered ring.

The nitrone used in the practice of this invention will typically be of the structural formula:

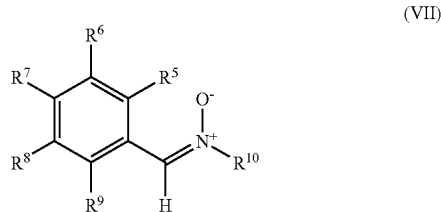

(VII)

wherein $R^5$, $R^6$, $R^7$, $R^8$ and $R^9$ are independently selected from the group consisting of H, substituted or unsubstituted straight, branched, or cyclic alkyl groups, alkenyl groups, alkynyl groups, aryl groups, heteroaryl groups, alkaryl groups, alkoxyl groups, halogen atoms, cyano groups, nitro groups, and combinations thereof, alternatively any two adjacent $R^5$, $R^6$, $R^7$, $R^8$ and $R^9$ groups taken together with the carbons to which they are attached can form a 5 to 8 membered ring including 0 to 2 heteroatoms selected from the group consisting of oxygen, nitrogen, and sulfur, and wherein $R^{10}$ is a substituted or unsubstituted straight, branched, or cyclic alkyl group.

Derivatives of nitrones having the functional core depicted in formula (I) or formula (VII) can also be used in the practice of this invention. The term "derivative", as used herein, is intended to refer to a compound resulting when one or more desirable substitutions are attached to the core compound of formula (I) or Formula (VII). To this end, the term "nitrone derivative", as used herein, is intended to refer to compounds having a nitrone functional core, as illustrated in the general formula (I) and general formula (VII). Accordingly, the term "nitrone derivatives" encompass all compounds formed where the R group substitutions of the general formulae (I) and (VII) are independently selected from substituted or unsubstituted straight, branched, or cyclic alkyl groups, alkenyl groups, alkynyl groups, aryl groups, heteroaryl groups, alkaryl groups, alkoxyl groups, haloalkyl groups, and combinations thereof, while the R group substitutions of formulae (VII) above may further include cyano and nitro substitutions. The term "alkyl", as used herein, is intended to refer to monovalent, saturated groups that are straight, branched or cyclic in structure and may comprise only carbon atoms, such as from 1 to about 10 carbon atoms, or may also include heteroatoms, such as for example, nitrogen (N), oxygen (O), and sulfur (S). For example, the alkyl substitution of .alpha.-phenyl-N-tert-butyl nitrone (PBN) is a tert-butyl group (a branched alkyl) attached to the nitrogen atom of the nitrone functional core. Examples of other alkyl groups include methyl, ethyl, n-propyl, isopropyl, n-butyl, isobutyl, n-hexyl, n-octyl, tert-octyl and the like. The alkyl substitution may further include generally non-reactive functional groups, such as a ketone, an ether, an ester, and an amide. The term "alkenyl", as used herein, is intended to refer to unsaturated organic substitutions having one or more double bonds in the structure. Examples of alkenyl groups include, without limitation, ethenyl (—CH=CH$_2$), n-propenyl (—CH$_2$CH=CH$_2$), and isopropenyl (—C(CH$_3$)=CH$_2$). The term "alkynyl", as used herein, is intended to refer to unsaturated organic substitution having one or more triple bonds in their structure. Examples of alkynyl groups include, without limitation, ethynyl, propargyl, and the like. The term "aryl", as used herein, is intended to refer to an unsaturated aromatic carbocyclic group from 6 to 14 carbon atoms having a single ring (e.g. phenyl) or multiple rings (e.g., naphthyl and anthryl). Unless otherwise constrained by the definition for the individual substituent, such aryl groups can be optionally be substituted with from 1 to 3 substituents selected from the group consisting of alkyl, alkoxy, alkaryloxy, alkenyl, alkynyl, amino, aminoacyl, amincarbonyl, alkoxycarbonyl, aryl, carboxyl, cycloalkoxy, cyano, halo, hydroxy, nitro, trihalomethyl, thioalkoxy, and the like. The term "heteroaryl", as used herein, is intended to refer to an aryl group containing one or more heteroatoms selected from oxygen, nitrogen, and sulfur. Examples of heteroaryl groups include thiazoles, oxazoles and pyridines. The term "heteroaryl" further includes multiple rings, such as fused ring structures (e.g., quinoline). The term "alkaryl", as used herein, is intended to refer to -alkylene-aryl groups having 1 to 20 carbon atoms in the alkylene moiety and from 6 to 14 carbon atoms in the aryl moiety. Examples of alkaryl groups include, without limitation, benzyl, phenethyl, and the like. The term "alkoxyl", as used herein, is intended to refer to the group "alkyl-O-". An ether group would constitute an alkoxyl substitution. Examples of alkoxy groups include, without limitation, methoxy, ethoxy, n-propoxy, isopropoxy, n-butoxy, tert-butoxy, sec-butoxy, n-pentyloxy, n-hexyloxy and the like. The term "alkaryloxy" refers to —O-alkylene-aryl groups, such as benzyloxy, phenethyloxy, and the like. The term "cyano", as used herein, is intended to refer to the group —CN. The term "halo" or "halogen", as used herein, is intended to refer to fluoro, chloro, bromo and iodo groups. The term "nitro" refers to the group —NO$_2$. It is also contemplated that one or more halogens may be substituents on the alkenyl, aklynyl, aryl and heteroaryl groups as well. Accordingly, examples of nitrone derivatives include linear nitrone compounds such as N-alkyl-α-alkyl nitrones (e.g., N-methyl-α-methyl nitrone or N-methyl-α-ethyl nitrone), N-alkyl-α-aryl nitrones (e.g., N-methyl-α-phenylnitrone, N-ethyl-α-phenylnitrone, N-isopropyl-α-phenylnitrone, N-isobutyl-α-phenylnitrone, N-s-butyl-α-phenylnitrone, N-t-butyl-α-phenylnitrone (PBN), N-t-pentyl-α-phenylnitrone), N-alkyl-α-cycloalkylnitrones (e.g., compounds corresponding to the N-alkyl-α-arylnitrone listed above such as N-isopropyl-α-cyclohexylnitrone, N-t-butyl-α-cyclohexynitrone, N-t-penyl-α-cyclohexylnitrone), and N-aryl-α-arylnitrone (e.g., N-phenyl-α-phenylnitrone).

non-aromatic and condensed rings. For example, adjacent R substitutions may be joined together to form an indole or a quinoline heteroaryl as the "aryl" group of the nitrone. Further examples include, without limitation, isoquinoline, indoline, and naphthyl fused ring systems. In addition, any of the atoms constituting the ring may be substituted with one or more substituents, such as an alkyl group(s).

The nitrones of formula (I), formula (VII) and derivatives thereof utilized in the practice of this invention can be efficiently made at a relatively low cost by the procedure described in U.S. Pat. No. 6,762,322. The teachings of U.S. Pat. No. 6,762,322 are incorporated herein by reference in their entirety.

The nitrone will react with the metal terminated polydiene rubber to replace the metal with a terminal hydroxylamine. The reaction of N-isopropylphenylnitrone with a living lithium terminated rubbery polymer is depicted as follows:

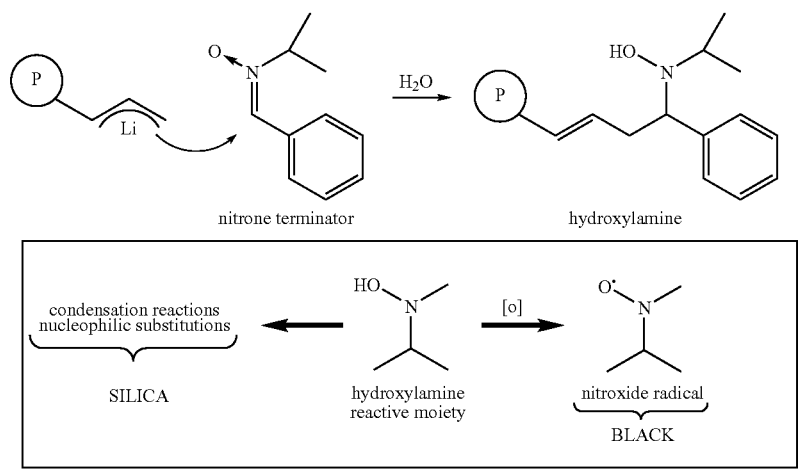

Alternatively, R$^1$ and R$^2$ of formula (I) may be joined together to form a ring structure containing the nitrone core therein. For example, the R$^1$ and R$^2$ substitutions may be joined together to form a 5-membered pyrroline-nitrone or a 6-membered piperidinyl-nitrone derivative. The ring structure including the carbon and nitrogen atoms to which the R$^1$ and R$^2$ are attached, respectively, may be as small as a 5-membered ring or as large as an 8-membered ring. Further, it is contemplated herein that where R$^1$ and R$^2$ are joined to form a ring structure, the ring may be one of aromatic, non-aromatic and condensed rings (e.g., quiniline, isoquinoline, indoline, and naphthyl-type nitrone derivatives) and further, the same or different carbon atoms each constituting the ring may be substituted with one or a plurality of substituents, such as an alkyl group(s). Accordingly, examples of cyclic nitrone compounds include pyrroline N-oxides (e.g., 1-pyrroline-N-oxide, 5,5-dimethyl-1-pyrroline-N-oxide (DMPO), 5,5-diethyl-1-pyrroline-N-oxide, 4,4diethyl-1-pyrroline-N-oxide, 3,3-dimethyl-1-pyrroline-N-oxide), pyrrole-N-oxide, and piperazine-N-oxide.

Alternatively, any two adjacent R$^5$, R$^6$, R$^7$, R$^8$ and R$^9$ groups of formula (VII) taken together with the carbons to which they are attached may be joined together form ring including 0 to 2 heteroatoms selected from the group consisting of oxygen, nitrogen, and sulfur. The ring structure including the carbon atoms to which the two R substitutions are attached may be as small as a 5-membered ring or as large as an 8-membered ring, fused to the phenyl. Further, it is contemplated herein that where two R groups are joined to form a ring structure, the ring may be one of aromatic, In this reaction P represents polymer chains of the rubbery polymer. As is shown, the polymer made having hydroxylamine functional end groups has good interaction with silica fillers and can easily transform into other species that have good interaction with carbon black. In any case, the end-group functionalized polymers made by the process of this invention are of the general structural formula:

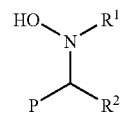

wherein P represents polymer chains of the rubbery polymer, and wherein R$^1$ and R$^2$ are independently selected from the group consisting of substituted or unsubstituted straight, branched, or cyclic alkylgroups, alkenyl groups, alkynyl groups, aryl groups, heteroaryl groups, alkaryl groups, alkoxyl groups, halo-alkyl groups, and combinations thereof. Alternatively, R$^1$ and R$^2$ taken together with the carbon and nitrogen to which they are attached form a 5 to 8 membered ring.

After the functionalization reaction is completed, it will normally be desirable to "kill" any living polydiene chains which remain. This can be accomplished by adding an alcohol, such as methanol or ethanol, to the polymer cement after the functionalization reaction is completed in order to eliminate any living polymer that was not consumed by the reaction with the nitrone. The end-group functionalized polydiene rubber can then be recovered from the solution utilizing standard techniques.

The rubbery compositions of this invention are of particular value in making tire tread compounds and in manufacturing tires which are normally comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting. However, they are also of value for use in manufacturing other products where good interaction with fillers is desirable, such as applications where low hysteresis is an advantage. For instance, functionalized rubbers made by utilizing the technique of this invention can also be beneficial employed in manufacturing power transmission belts. In any case, the rubbery composition of this invention can be blended with a wide variety of additional ingredients to attain the desired combination of physical attributes. For instance, it may be desirable to blend one or more resins, such as, coumarone-indene resin into the composition in cases where tire treads for high performance tires are being manufactured. The resin will normally be added in an amount that is within the range of about 5 phr to about 60 phr in race tire applications. In passenger tires that are designed for high speed applications, the resin will typically be added in an amount that is within the range of 2 phr to about 20 phr. In general purpose passenger tire applications, it is typically preferred for the tread compound to contain only a small amount (1 phr to 5 phr) of a resin or for the tread formulation to not contain any resin at all.

The functionalized rubbery polymers of this invention can be compounded utilizing conventional ingredients and standard techniques. For instance, the rubber compound will typically also include sulfur, accelerators, waxes, scorch inhibiting agents and processing aids. In most cases, the tread rubber formulation will be compounded with sulfur and/or a sulfur containing compound, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Tire tread rubber formulations made with the functionalized rubbers of this invention will also normally contain from 0.5 to 10 phr of zinc oxide with 1 to 5 phr being preferred. These blends can optionally contain from 0 to 30 phr of tackifier resins, 0 to 10 phr of reinforcing resins, 1 to 10 phr of fatty acids, 0 to 2.5 phr of peptizers and 0 to 1 phr of scorch inhibiting agents.

The tire tread rubber formulations of this invention can be used in tire treads in conjunction with ordinary tire manufacturing techniques. Tires are built utilizing standard procedures with the tread compound of this invention simply being substituted for the rubber compounds typically used as the tread rubber. After the tire has been built with the tread formulations of this invention, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

In this experiment N-t-butylphenylnitrone was systhesized utilizing the procedure described in U.S. Pat. No. 6,762,322. In the procedure used a dry 3-liter, 3-necked, round bottom flask equipped with a mechanical paddle stirrer, a nitrogen gas flow, and a condenser was charged with 87 grams (83.5 ml; 0.82 moles) of benzaldehyde and 63 grams (90.5 ml; 0.86 moles) of t-butylamine. The mixture was stirred for about 4 hours at room temperature to allow complete formation of N-benzylidene-t-butylamine. After removal of the nitrogen gas flow and the condenser, the reaction flask was evacuated under an aspirator (about 24" Hg vacuum) for about 15 minutes. The aspirator was detached and 288 grams (3.428 moles) of sodium bicarbonate followed by 500 ml of water and 500 ml of acetone were added to the 3-liter flask. The condenser was reattached to the flask and about 600 gm (0.98 moles) of Oxone® oxidizing agent was carefully added portion-wise through a powder-addition funnel to the stirring reaction over a period of about 10 minutes. The reaction began to slowly foam from the evolution of carbon dioxide and turn to a bluish tinge as the temperature rose to about 35° C. The reaction was stirred for one hour after the Oxone® oxidizing agent was added, and GC analysis revealed a trace amount of starting imine (3.72 minutes) and a large peak representing 2-t-butyl-3-phenyl oxaziridine (4.45 minutes).

The reaction mixture was poured into a beaker containing a 2-phase solution of 3000 ml water and 300 ml toluene. Insoluble salts were filtered out and the aqueous layer separated in a separatory funnel. The upper toluene layer was placed in a 1-liter single-neck, round bottom flask and concentrated over a 30-minute period on a rotary evaporator at 50° C. under vacuum (about 24" Hg) to remove traces of acetone and water. Several silicon carbide boiling chips were added to the concentrated oxaziridine and the oxaziridine/toluene solution was refluxed at 115° C. to 125° C. for 2–3 hours to form the desired N-t-butylphenylnitrone product. The excess toluene was removed under vacuum and the resulting clear brown liquid N-t-butylphenylnitrone was poured into a crystallizing dish and placed in a fume hood. Crystallization was almost immediate, affording 113.1 gm of crude crystalline N-t-butylphenylnitrone (78% theoretical yield).

EXAMPLES 2–7

In this series of experiments living styrene-butadiene rubbers were end-group functionalized with various nitrones, compounded in carbon black and silica filled formulations, and evaluated with respect to physical properties. The living styrene-butadiene rubbers were made in a one-gallon (3.8 liter) batch reactor which was equipped with an agitator, steam heating, and glycol cooling. The polymerizations were conducted at 65° C. for two hours. The polymer specification was 75% 1,3-butadiene and 25% styrene. The polymerizations were initiated with n-butyl lithium and modified with one mole ratio of N,N,N',N'-tetramethylethylenediamine (TMEDA) to lithium. The target Mooney large 1/4 range was 40–45, with an onset glass-transition temperature of approximately −35° C. All polymerizations were killed with a slight excess of the nitrone being used as the terminator (1.1:1.0 mole ratio to lithium), followed after a few minutes by a slight excess of ethanol (1.1:1.0 mole ratio to terminator). BHT antioxidant was added to each cement sample at a level of 1.0 phr. Each sample was dried using a drum dryer. A control (Example 2) was also carried out for comparative purposes and was terminated with ethanol rather than a nitrone. The nitrone used to end-group functionalize the rubber in each experiment is identified in Table 3 and Table 4.

Each of the end-group functionalized rubber samples and the controls were compounded with the compositions of the non-productive (without curatives) and productive (with curatives) formulations being shown in Table 2. The amounts shown are in parts by weight.

TABLE 2

| Carbon Black Recipe | | Silica Filled Recipe | |
|---|---|---|---|
| | parts | | parts |
| Non-productive | | Non-Productive | |
| Polymer | 100.00 | Polymer | 100.00 |
| Carbon Black | 55.00 | Silica | 60.00 |
| Oil | 10.00 | Coupling Agent (50/50) | 9.60 |
| Stearic Acid | 3.00 | Wax | 1.50 |
| Agerite Resin D antioxidant | 1.50 | Santoflex 13 | 2.50 |
| | | Stearic Acid | 3.00 |
| Productive | | Productive | |
| Santocure CBS* | 1.20 | Wingstay 100 antioxidant | 0.50 |
| Sulfur | 1.40 | Zinc Oxide | 2.50 |
| | | Santocure CBS | 2.00 |
| | | 1,3-diphenylguanidine (DPG) | 1.60 |
| | | Sulfur | 1.70 |

*CBS is cyclohexylbenzothiazole sulfenamide

In the case of the formulation that was filled with carbon black, one-half of the rubber was initially added, followed by the addition of the pigments, with the remaining one-half of the rubber being added subsequently. The oil was added after two minutes of mixing time with mixing being continued until either 5 minutes or until a temperature of 300° F. (149° C.) was reached (whichever came first). In the productive stage the sulfur and Santocure CBTS were added by mill mixing.

In the case of the formulation that was filled with silica, there was an initial rubber breakdown period of 30 seconds which was followed by the addition of all pigments. After reaching a temperature of 240° F. (116° C.) the oil was added with the mixing speed being increased (if necessary) to reach a temperature of 320° F. (160° C.) at which point the mixing speed was adjusted to maintain the temperature at 320° F. (160° C.) for 2 minutes. The productive formulation was made by adding the productive components of the formulation with mixing being carried out for either 2 minutes or until a temperature of 230° C. (110° C.) was reached (whichever came first).

The G'@8.33 Hz and tan δ at 60° C. for each of the rubbers that was functionalized with a nitrone and the controls are reported in Table 3. In Example 2 the styrene-butadiene rubber was not functionalized and serves as a control. Table 3 reports the G'@8.33 Hz and tan δ at 60° C. for the carbon black filled formulations. Table 4 reports the G'@8.33 Hz and tan δ at 60° C. for the silica filled formulations.

TABLE 3

Carbon Black Filled Styrene-Butadiene Rubber Formulations

| Example | Nitrone | G'@8.33 Hz | Tan δ at 60° C. |
|---|---|---|---|
| 2 | none | 511.43 | 0.204 |
| 3 | N-t-butylphenylnitrone | 529.14 | 0.187 |
| 4 | N-isopropylphenylnitrone | 570.2 | 0.178 |
| 5 | N-isopropyl-4-dimethylaminophenylnitrone | 544.49 | 0.192 |
| 6 | diphenylnitrone | 519.34 | 0.193 |
| 7 | N-isopropyl-4-pyrrolidinophenylnitrone | 615.95 | 0.161 |

TABLE 4

Silica Filled Styrene-Butadiene Rubber Formulations

| Example | Nitrone | G'@8.33 Hz | Tan δ at 60° C. |
|---|---|---|---|
| 2 | none | 497.53 | 0.124 |
| 3 | N-t-butylphenylnitrone | 487.02 | 0.121 |
| 4 | N-isopropylphenylnitrone | 502.14 | 0.109 |
| 5 | N-isopropyl-4-dimethylaminophenylnitrone | 480.82 | 0.119 |
| 6 | diphenylnitrone | 427.8 | 0.110 |
| 7 | N-isopropyl-4-pyrrolidinophenylnitrone | 524.47 | 0.107 |

A low tan δ value at 60° C. is indicative of low rolling resistance and good tire wear characteristics. As can be seen by reviewing Table 3 and Table 4 all of the rubber samples that were filled with both carbon black and silica exhibited lower tan δ values at 60° C. than did the controls. This shows that nitrones can be used to functionalize rubbery polymers used in tire tread formulations to improve rolling resistance and tire tread wear characteristics.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a polydiene rubber having a high level of affinity for fillers which comprises reacting a metal terminated polydiene rubber with a nitrone wherein the metal terminated polydiene rubber is a living polymer.

2. A process as specified in claim 1 wherein the metal is lithium.

3. A process as specified in claim 2 wherein the polydiene rubber is selected from the group consisting of polybutadiene rubber, polyisoprene rubber, styrene-butadiene rubber, styrene-isoprene-butadiene rubber, isoprene-butadiene rubber, and styrene-isoprene rubber.

4. A process as specified in claim 2 wherein the nitrone is of the structural formula:

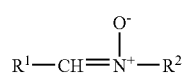

wherein $R^1$ and $R^1$, are independently selected from the group consisting of substituted or unsubstituted straight, branched, or cyclic alkylgroups, alkenyl, groups, alkynyl groups, aryl groups, heteroaryl groups, alkaryl groups, alkoxyl groups, halo-alkyl groups, and combinations thereof.

5. A process for preparing a polydiene rubber having a high level of affinity for fillers which comprises reacting a lithium terminated polydiene rubber with a nitrone wherein the nitrone is of the structural formula:

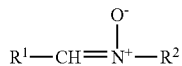

wherein $R^1$ and $R^2$ taken together with the carbon and nitrogen to which they are attached form a 5 to 8 membered ring.

6. A process for preparing a polydiene rubber having a high level of affinity for fillers which comprises reacting a lithium terminated polydiene rubber with a nitrone wherein the nitrone is of the structural formula:

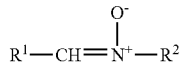

wherein $R^1$ represents a phenyl group and wherein $R^2$ represents an isopropyl group.

7. A process as specified in claim 2 wherein the metal terminated polydiene rubber is reacted with the nitrone at a temperature which is within the range of about 0° C. to about 150° C.

8. A process as specified in claim 7 wherein the metal terminated polydiene rubber has a number average molecular weight which is within the range of 50,000 to 500,000.

9. A process for preparing a polydiene rubber having a high level of affinity for fillers which comprises reacting a lithium terminated polydiene rubber with N-isopropyl-4-pyrrolidinophenylnitrone.

10. A process as specified in claim 2 wherein the metal terminated polydiene rubber is a styrene-butadiene rubber.

11. A process as specified in claim 2 wherein the metal terminated polydiene rubber is a polybutadiene rubber.

12. A process as specified in claim 2 wherein the nitrone is of the structural formula:

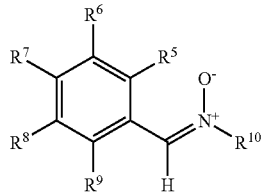

wherein $R^5$, $R^6$, $R^7$, $R^8$ and $R^9$ are independently selected from the group consisting of hydrogen atoms, substituted or unsubstituted straight, branched, or cyclic alkyl groups, alkenyl groups, alkynyl groups, aryl groups, heteroaryl groups, alkaryl groups, alkoxyl groups, halogen atoms, cyano groups, nitro groups, and combinations thereof, and wherein $R^{10}$ is a substituted or unsubstituted straight, branched, or cyclic alkyl group.

13. A process as specified in claim 5 wherein the polydiene rubber is selected from the group consisting of polybutadiene rubber, polyisoprene rubber, styrene-butadiene rubber, styrene-isoprene-butadiene rubber, isoprene-butadiene rubber, and styrene-isoprene rubber.

14. A process as specified in claim 5 wherein the metal terminated polydiene rubber is reacted with the nitrone at a temperature which is within the range of about 0° C. to about 150° C.

15. A process as specified in claim 5 wherein the metal terminated polydiene rubber has a number average molecular weight which is within the range of 50,000 to 500,000.

16. A process as specified in claim 9 wherein the polydiene rubber is selected from the group consisting of polybutadiene rubber, polyisoprene rubber, styrene-butadiene rubber, styrene-isoprene-butadiene rubber, isoprene-butadiene rubber, and styrene-isoprene rubber.

17. A process as specified in claim 9 wherein the metal terminated polydiene rubber is reacted with the nitrone at a temperature which is within the range of about 0° C. to about 150° C.

18. A process as specified in claim 9 wherein the metal terminated polydiene rubber has a number average molecular weight which is within the range of 50,000 to 500,000.

19. A process as specified in claim 18 wherein the metal terminated polydiene rubber is a styrene-butadiene rubber.

* * * * *